US012649350B2

(12) United States Patent
Kwak et al.

(10) Patent No.: US 12,649,350 B2
(45) Date of Patent: Jun. 9, 2026

(54) VEHICLE HEAT EXCHANGE MODULE

(71) Applicant: Hanon Systems, Daejeon (KR)

(72) Inventors: Jung Myung Kwak, Daejeon (KR); Jun Sig Choi, Daejeon (KR); Yong Hee Kim, Daejeon (KR); In-Guk Hwang, Daejeon (KR)

(73) Assignee: HANON SYSTEMS, Daejeon (KR)

( * ) Notice: Subject to any disclaimer, the term of this patent is extended or adjusted under 35 U.S.C. 154(b) by 0 days.

(21) Appl. No.: 18/572,336

(22) PCT Filed: Dec. 12, 2022

(86) PCT No.: PCT/KR2022/020146
§ 371 (c)(1),
(2) Date: Dec. 20, 2023

(87) PCT Pub. No.: WO2023/121097
PCT Pub. Date: Jun. 29, 2023

(65) Prior Publication Data
US 2025/0010685 A1     Jan. 9, 2025

(30) Foreign Application Priority Data

Dec. 24, 2021     (KR) ........................ 10-2021-0187501

(51) Int. Cl.
B60H 1/00 (2006.01)
B60H 1/32 (2006.01)
(Continued)

(52) U.S. Cl.
CPC ..... B60H 1/00328 (2013.01); B60H 1/00535 (2013.01); B60H 1/32 (2013.01);
(Continued)

(58) Field of Classification Search
CPC .. B60H 1/00328; B60H 1/00535; B60H 1/32; B60H 1/3228; B60H 1/3229; F28D 21/00; F28F 9/002; F28F 9/007
See application file for complete search history.

(56) References Cited

U.S. PATENT DOCUMENTS 3,381,493 A * 5/1968 Dixon .................. B60H 1/3227
62/239
4,313,314 A * 2/1982 Boyanich .............. F25B 43/006
62/324.1
(Continued)

FOREIGN PATENT DOCUMENTS

DE 102020109006 A1 * 10/2021 ........... B60H 1/3229
EP 3388769 A1 * 10/2018 .............. F28F 3/025
(Continued)

OTHER PUBLICATIONS

International Search Report issued in PCT/KR2022/020146 on Mar. 16, 2023.

*Primary Examiner* — Ljiljana V. Ciric

(74) *Attorney, Agent, or Firm* — NORTON ROSE FULBRIGHT US LLP

(57) ABSTRACT

A vehicle heat exchange module in which a plate-shaped manifold is applied, heat exchange components are disposed on a bracket including a bottom portion and a wall portion, and the heat exchange components are separated at front and rear sides based on the wall portion.

20 Claims, 14 Drawing Sheets

10

400
302A
302B
210
301
303
120
110
302

100: 110, 120
200: 210, 220
300: 301, 302, 303

UP
LEFT     REAR
FRONT     RIGHT
DOWN

(51) Int. Cl.
  F28D 21/00 (2006.01)
  F28F 9/00 (2006.01)
  F28F 9/007 (2006.01)
(52) U.S. Cl.
  CPC ......... B60H 1/3228 (2019.05); B60H 1/3229 (2013.01); F28D 21/00 (2013.01); F28F 9/002 (2013.01); F28F 9/007 (2013.01)

(56) References Cited

U.S. PATENT DOCUMENTS

| | | | | |
|---|---|---|---|---|
| 4,978,429 | A * | 12/1990 | Sears | B01D 1/221 |
| | | | | 202/172 |
| 5,996,684 | A * | 12/1999 | Clifton | F28F 9/002 |
| | | | | 165/4 |
| 6,263,954 | B1 * | 7/2001 | Nakayama | F28F 9/002 |
| | | | | 248/74.1 |
| 7,775,265 | B2 * | 8/2010 | Chissus | F28F 1/16 |
| | | | | 165/173 |
| 7,963,315 | B2 * | 6/2011 | Ishikawa | B60H 1/00535 |
| | | | | 296/187.05 |
| 8,561,678 | B2 * | 10/2013 | Richardson | F28F 21/08 |
| | | | | 165/173 |
| 8,789,805 | B2 * | 7/2014 | Piggott | F28F 9/002 |
| | | | | 248/560 |
| 9,453,454 | B2 * | 9/2016 | Neal | F01P 5/10 |
| 9,534,852 | B2 * | 1/2017 | Gierl | F28D 15/00 |
| 9,714,798 | B2 * | 7/2017 | Kinder | F28D 1/0341 |
| 9,850,920 | B2 * | 12/2017 | Inada | F15B 13/0814 |
| 9,909,821 | B2 * | 3/2018 | Bardeleben | F28D 9/0056 |
| RE46,981 | E * | 8/2018 | Neal | F01M 5/002 |
| 10,215,511 | B2 * | 2/2019 | Fudala | F28F 9/0246 |
| 10,303,189 | B2 * | 5/2019 | Mudd | G05D 7/0682 |
| 10,589,598 | B2 * | 3/2020 | Connell | B60H 1/3229 |
| 10,683,832 | B2 * | 6/2020 | Yoon | F28F 9/22 |
| 10,690,422 | B2 * | 6/2020 | Storage | F28F 9/002 |
| 10,801,372 | B2 * | 10/2020 | Rousseau | F28D 1/05366 |
| 11,192,425 | B2 * | 12/2021 | Oh | B60H 1/00007 |
| 11,274,884 | B2 * | 3/2022 | Thomas | F28F 9/005 |
| 11,440,376 | B2 * | 9/2022 | Calderone | B60K 7/0007 |
| 11,453,267 | B2 * | 9/2022 | Koberstein | B60H 1/00907 |
| 11,993,134 | B2 * | 5/2024 | Oh | B60H 1/3229 |
| 12,083,860 | B2 * | 9/2024 | Kim | B60H 1/3229 |
| 12,140,077 | B2 * | 11/2024 | Wiedenhoefer | B23P 15/26 |
| 12,151,539 | B2 * | 11/2024 | Calderone | B60H 1/3223 |
| 12,337,650 | B2 * | 6/2025 | Zhang | B60H 1/3229 |
| 12,358,343 | B2 * | 7/2025 | Meda | B60H 1/00364 |
| 12,391,096 | B2 * | 8/2025 | Rhee | F25B 41/40 |
| 12,398,917 | B2 * | 8/2025 | Aly | F28F 1/022 |
| 12,422,200 | B2 * | 9/2025 | Ito | H05K 7/20154 |
| 2002/0078702 | A1 * | 6/2002 | Makizono | F28D 7/04 |
| | | | | 62/271 |

| | | | | |
|---|---|---|---|---|
| 2004/0110429 | A1 * | 6/2004 | Wizgall | F02M 35/10288 |
| | | | | 165/41 |
| 2007/0261433 | A1 * | 11/2007 | Mikita | F25B 40/00 |
| | | | | 62/503 |
| 2008/0000945 | A1 * | 1/2008 | Hidaka | F28F 9/0202 |
| | | | | 228/2.1 |
| 2008/0210405 | A1 * | 9/2008 | Datta | F04B 17/00 |
| | | | | 257/E23.098 |
| 2009/0205359 | A1 * | 8/2009 | Major | B60H 1/3227 |
| | | | | 62/509 |
| 2010/0071639 | A1 * | 3/2010 | Wegner | F02B 37/013 |
| | | | | 123/563 |
| 2014/0014307 | A1 * | 1/2014 | Richardson | F28D 1/05383 |
| | | | | 165/173 |
| 2016/0039277 | A1 * | 2/2016 | Falls | H02K 7/116 |
| | | | | 310/58 |
| 2016/0215664 | A1 * | 7/2016 | Boyer | F01P 3/12 |
| 2017/0145894 | A1 * | 5/2017 | Neal | F01M 5/021 |
| 2017/0205153 | A1 * | 7/2017 | Hermida Domínguez | |
| | | | | F28F 9/001 |
| 2017/0370658 | A1 * | 12/2017 | Kirklin | F28F 9/002 |
| 2018/0231282 | A1 * | 8/2018 | Meldrum | F25B 41/40 |
| 2018/0292140 | A1 * | 10/2018 | Mayo | F28F 9/0229 |
| 2019/0039440 | A1 * | 2/2019 | Calderone | B60K 7/0007 |
| 2019/0390811 | A1 * | 12/2019 | Shibata | F16L 41/03 |
| 2020/0309472 | A1 * | 10/2020 | Thomas | F28F 9/0246 |
| 2022/0194167 | A1 * | 6/2022 | Morimoto | B60H 1/00571 |
| 2022/0227200 | A1 * | 7/2022 | Hildebrand | B60H 1/00271 |
| 2022/0388374 | A1 * | 12/2022 | Calderone | B60K 7/0007 |
| 2023/0314053 | A1 * | 10/2023 | Lang | F16L 41/00 |
| | | | | 62/434 |
| 2024/0017588 | A1 * | 1/2024 | Li | B60H 1/00885 |
| 2024/0131903 | A1 * | 4/2024 | Kang | B60H 1/3229 |
| 2024/0157759 | A1 * | 5/2024 | Jiang | B60H 1/00885 |
| 2024/0175608 | A1 * | 5/2024 | Jiang | F25B 1/00 |
| 2024/0181846 | A1 * | 6/2024 | Lee | B60H 1/3227 |
| 2024/0230184 | A1 * | 7/2024 | Qiao | F25B 39/00 |
| 2024/0399837 | A1 * | 12/2024 | Calderone | F25B 41/40 |
| 2024/0399838 | A1 * | 12/2024 | Calderone | F25B 41/40 |
| 2025/0010685 | A1 * | 1/2025 | Kwak | B60H 1/32 |
| 2025/0010692 | A1 * | 1/2025 | Kwak | B60H 1/3223 |
| 2025/0020419 | A1 * | 1/2025 | Hwang | F28F 9/0202 |
| 2025/0052460 | A1 * | 2/2025 | Tan | F25B 41/20 |
| 2025/0058605 | A1 * | 2/2025 | Woo | B60H 1/32281 |
| 2025/0242666 | A1 * | 7/2025 | Lee | B60H 1/3227 |
| 2025/0276561 | A1 * | 9/2025 | Kang | B60H 1/3229 |

FOREIGN PATENT DOCUMENTS

| | | | |
|---|---|---|---|
| KR | 20190068125 | A | 6/2019 |
| KR | 20200031907 | A | 3/2020 |
| KR | 102189058 | B1 | 12/2020 |
| KR | 20210090004 | A | 7/2021 |

* cited by examiner

100: 110, 120
200: 210, 220
300: 304, 305

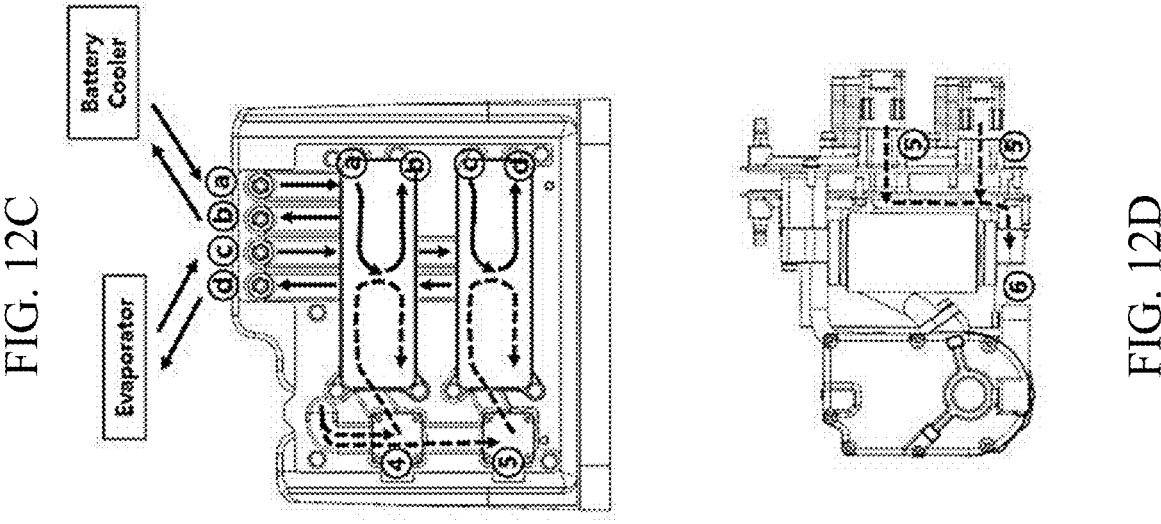
FIG. 12C
FIG. 12D
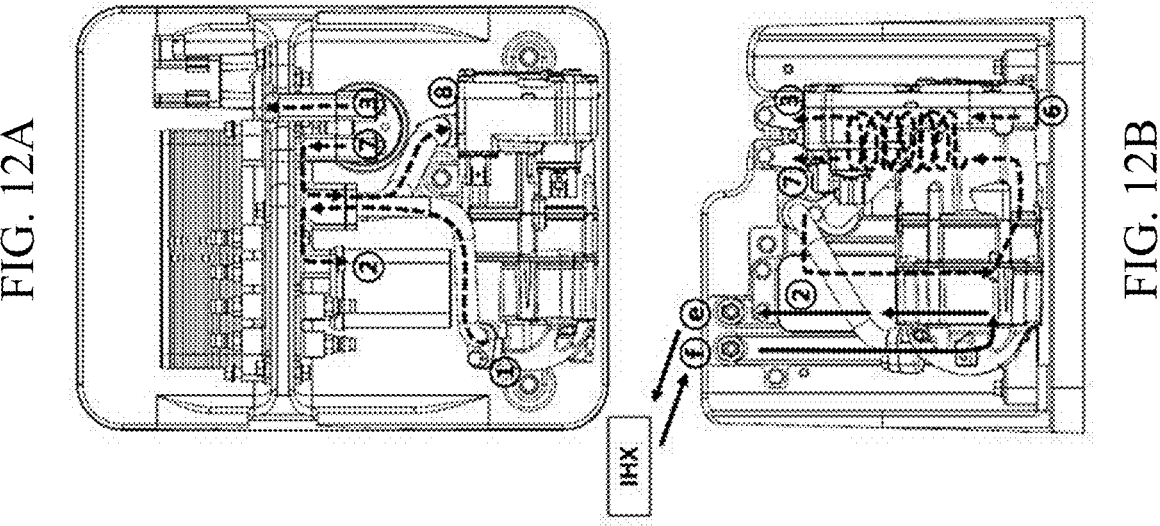
FIG. 12A
FIG. 12B

VEHICLE HEAT EXCHANGE MODULE

CROSS REFERENCE TO RELATED APPLICATIONS

This patent application is a national phase under 35 U.S.C. § 371 of International Patent Application No. PCT/KR2022/020146 filed Dec. 12, 2022, which claims the benefit of priority from Korean Patent Application No. 10-2021-0187501 filed Dec. 24, 2021, each of which is hereby incorporated herein by reference in its entirety for all purposes.

TECHNICAL FIELD

The present invention relates to a vehicle heat exchange module, and more particularly, to a vehicle heat exchange module, in which a plate-shaped manifold is applied, heat exchange components are disposed on a bracket including a bottom portion and a wall portion, and the heat exchange components are separated at front and rear sides based on the wall portion, such that the vehicle heat exchange module may be miniaturized, advantageous in terms of noise, vibration, and harshness (NVH), and easily mounted in a vehicle body.

BACKGROUND ART

Recently, there has been a need to develop environmental-friendly vehicles, which may be substantially substituted for internal combustion engine vehicles, in order to improve energy efficiency and cope with environmental pollution. The environmental-friendly vehicles broadly include an electric or hydrogen vehicle that uses a battery or a fuel cell as an energy source, and a hybrid vehicle that operates by using an engine and a battery. The environmental-friendly vehicle includes an engine cooling system configured to manage a process of cooling/heating the engine, and an electrical component cooling system configured to manage heat of electrical components such as an electric motor.

The electrical component cooling system mainly cools an electrical component, an actuator, an HSG (hybrid start and generator), and the like by using a coolant. The electrical component is structured to heat the battery in cold weather by allowing the coolant to bypass a radiator through a bypass circuit and allowing waste heat of a PE component (power electronics) to pass through the battery.

The electrical component cooling system of the environmental-friendly vehicle needs to satisfy various uses such as heating, cooling, and waste heat recovery from a plurality of heat exchange components. However, because of a limitation in layout space in the vehicle, there may occur problems in that difficulty in disposing the components, designing a hose route, and connecting the components and the hose increases, a large number of processes are required to mount and connect the components and the hose individually in order to mount the components in the vehicle, resistance increases at the coolant side because of a complicated route, and a high load is applied to a water pump.

DOCUMENT OF RELATED ART

Korean Patent Application Laid-Open No. 10-2020-0031907 (published on Mar. 25, 2020)

DISCLOSURE

Technical Problem

The present invention has been made in an effort to solve the above-mentioned problem, and an object of the present invention is to provide a vehicle heat exchange module, in which a plate-shaped manifold is applied, heat exchange components are disposed on a bracket including a bottom portion and a wall portion, and the heat exchange components are separated at front and rear sides based on the wall portion, such that the vehicle heat exchange module may be miniaturized, advantageous in terms of NVH, and easily mounted in a vehicle body.

Technical Solution

A heat exchange module according to an example of the present invention includes: heat exchange components: manifolds configured to provide flow paths through which a refrigerant or coolant flows between the heat exchange components; and a bracket configured to provide a mounting structure in which the manifold and the heat exchange components are mounted, in which the bracket includes: a bottom portion configured to define a bottom; and a wall portion extending upward from the bottom portion and configured to define a wall, and in which the heat exchange components are separated and disposed at front and rear sides based on the wall portion.

The manifolds may include: a plate-shaped first manifold having a first flow path formed therein; and a plate-shaped second manifold having a second flow path formed therein, the first manifold may be coupled to a front surface of the wall portion, and the second manifold may be coupled to a rear surface of the wall portion.

At least some of the components mounted forward of the wall portion may be mounted on the first manifold, and at least some of the components mounted rearward of the wall portion may be mounted on the second manifold.

The first manifold may have at least one first port configured to communicate with the first flow path and structured to protrude to a predetermined degree rearward from a rear surface of the first manifold, and the wall portion and the second manifold may respectively have penetration structures that penetrate the wall portion and the second manifold so that the first port penetrates the wall portion and the second manifold.

At least some of the components mounted rearward may be coupled directly to the first port and communicate directly with the first flow path through the first port.

The second manifold may have at least one second port configured to communicate with the second flow path and structured to protrude to a predetermined degree rearward from a rear surface of the second manifold, and the wall portion and the first manifold may respectively have penetration structures that penetrate the wall portion and the second manifold so that the second port penetrates the wall portion and the second manifold.

At least some of the components mounted forward may be coupled directly to the second port and communicate directly with the second flow path through the second port.

The first manifold may include: at least one first inlet port through which the refrigerant or coolant is introduced from the outside; and at least one first discharge port through which the refrigerant or coolant is discharged to the outside, the second manifold may include: at least one second inlet port through which the refrigerant or coolant is introduced from the outside; and at least one second discharge port through which the refrigerant or coolant is discharged to the outside, the first inlet port and the first discharge port may be positioned on an upper portion of the first manifold, and the second inlet port and the second discharge port may be positioned on an upper portion of the second manifold.

The first manifold may have a structure in which a flat first rear surface plate is stacked on and coupled to a rear surface of a first front surface plate in which the first flow path is recessed, and the second manifold may have a structure in which a flat second rear surface plate is stacked on and coupled to a rear surface of a second front surface plate in which the second flow path is recessed.

A rear surface of the first manifold may be disposed to adjoin a front surface of the wall portion and coupled to the front surface of the wall portion by bolting, and a rear surface of the second manifold may be disposed to adjoin a rear surface of the wall portion and coupled to the rear surface of the wall portion by bolting.

At least one bolt groove may be formed in the bottom portion of the bracket, and at least some of the heat exchange components may be coupled to the bottom portion of the bracket by bolting through the bolt groove.

At least some of the heat exchange components may be mounted on the manifold and communicate directly with the flow path of the manifold, and at least some of the remaining heat exchange components may be mounted on the bottom portion of the bracket and fluidly connected to the flow path of the manifold through a hose.

The heat exchange components may include a water-cooled condenser, an accumulator, a compressor, and a chiller, the water-cooled condenser, the accumulator, and the compressor may be disposed forward of the wall portion, and the chiller may be provided as two or more chillers disposed rearward of the wall portion.

The water-cooled condenser and the accumulator may be mounted directly on the first manifold, the compressor may be mounted directly on the bottom portion of the bracket, and the chiller may be mounted directly on the second manifold.

A first entrance/exit port of the accumulator may be coupled to a port of the first manifold and communicate directly with the first flow path, a second entrance/exit port of the accumulator may protrude from a rear surface of the second manifold and be coupled directly to a second port penetrating the wall portion forward through a penetration structure penetrating the wall portion and the first manifold, and the second entrance/exit port may communicate directly with the second flow path.

The chiller may protrude from a rear surface of the first manifold and be coupled directly to a first port penetrating the wall portion rearward through a penetration structure penetrating the wall portion and the second manifold, and the chiller may communicate directly with the first flow path.

The compressor may be fluidly connected to the first flow path of the first manifold through a hose.

At least a partial region of at least one of the first and second flow paths may have a branch pipe structure in which a plurality of unit flow paths overlaps one another.

The wall portion may be biased toward one side from a center of the bottom portion.

The bottom portion may have a bolt hole for mounting the bottom portion in a vehicle body.

Advantageous Effects

According to the present invention, the plate-shaped manifold is applied, the heat exchange components are disposed on the bracket including the bottom portion and the wall portion, and the heat exchange components are separated at the front and rear sides based on the wall portion, such that the vehicle heat exchange module may be miniaturized, advantageous in terms of NVH, and easily mounted in the vehicle body.

In addition, among the heat exchange components, the relatively high-temperature components and the relatively low-temperature components are separated and disposed based on the wall portion, such that a thermal loss may be reduced, and overall heat exchange efficiency may be improved.

In addition, the penetration structure may be formed in the wall portion, and the manifold disposed on the front surface of the wall portion and the manifold disposed on the rear surface may communicate directly with each other, such that the pipes may be advantageously excluded.

In addition, the inlet port and the discharge port of the manifold are disposed on the upper portion of the manifold, such that the work and assembling may be easily performed.

BRIEF DESCRIPTION OF THE DRAWINGS

FIG. 12 is a view illustrating a flow of refrigerant/coolant according to the example of the present invention.

BEST MODE

Figure 1:
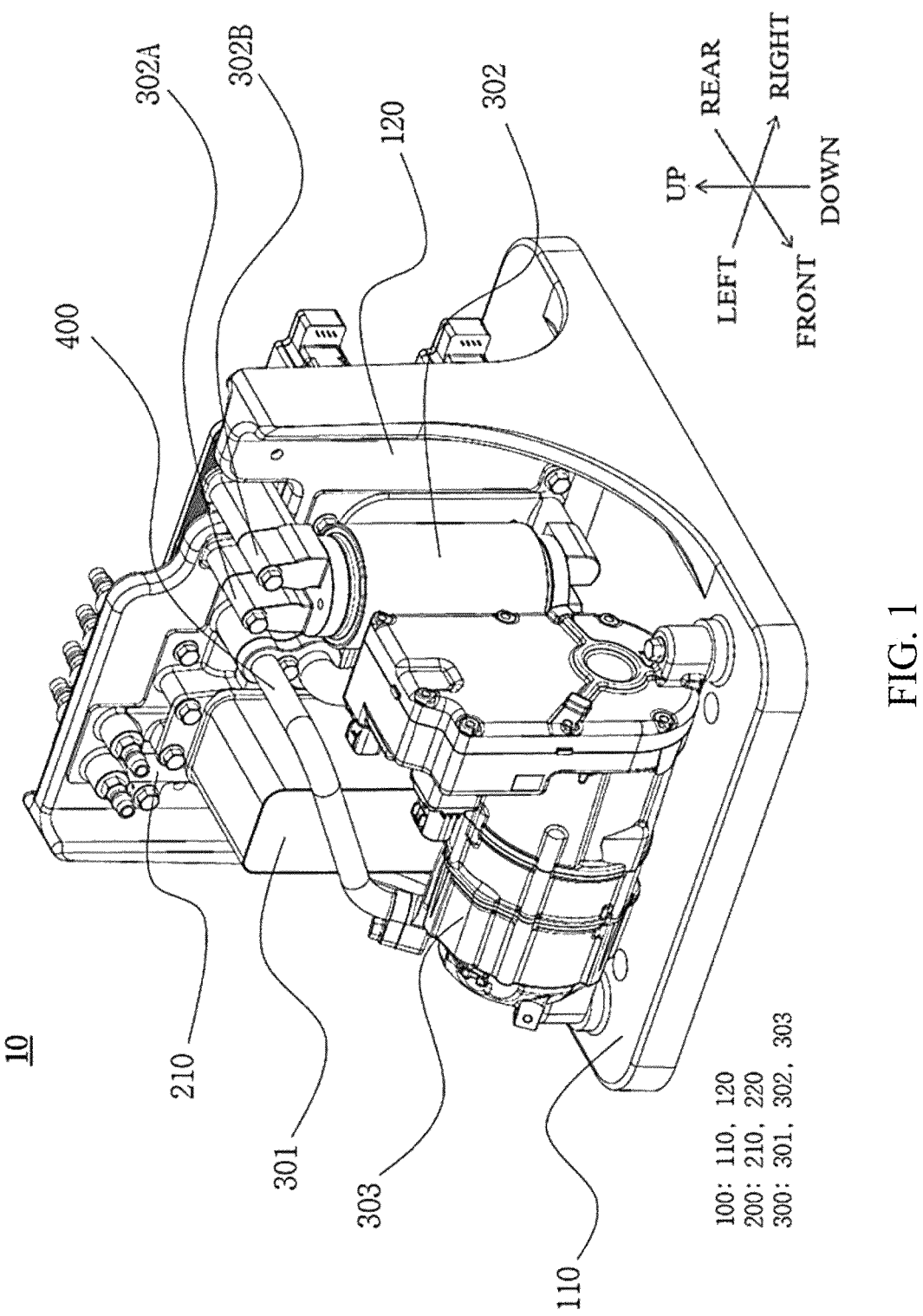
FIG. 1 is a perspective view illustrating a heat exchange module according to an example of the present invention when viewed from the front side.

Hereinafter, the present invention will be described with reference to the accompanying drawings.

As used herein, the terms "upper," "lower," "front," "rear," "forward," and "rearward" are used for convenience of description with reference to the orientation shown in the drawings, and are not intended to be limiting.

Figure 2:
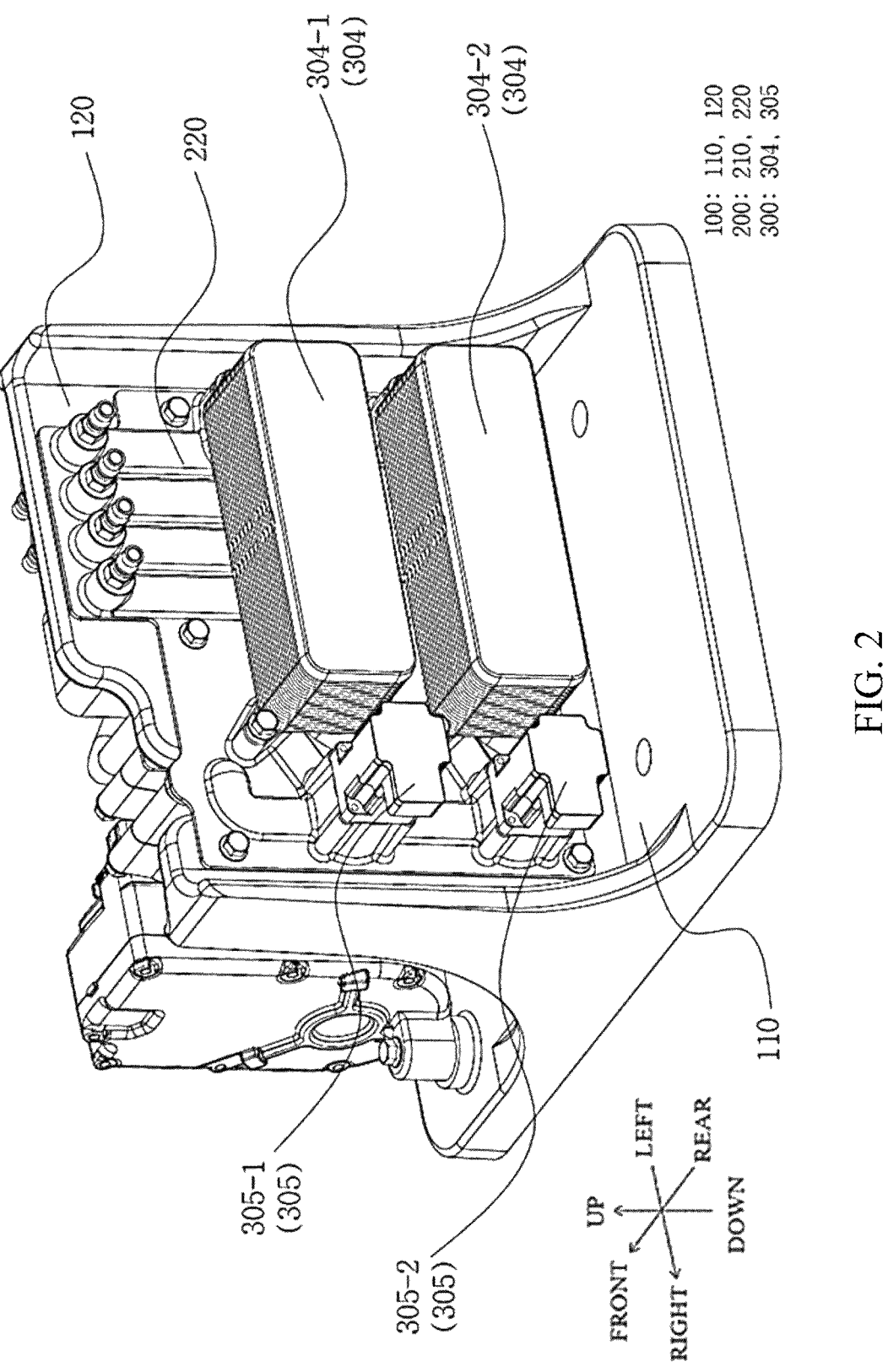
FIG. 2 is a perspective view illustrating the heat exchange module in FIG. 1 when viewed from the rear side.
Figure 3:
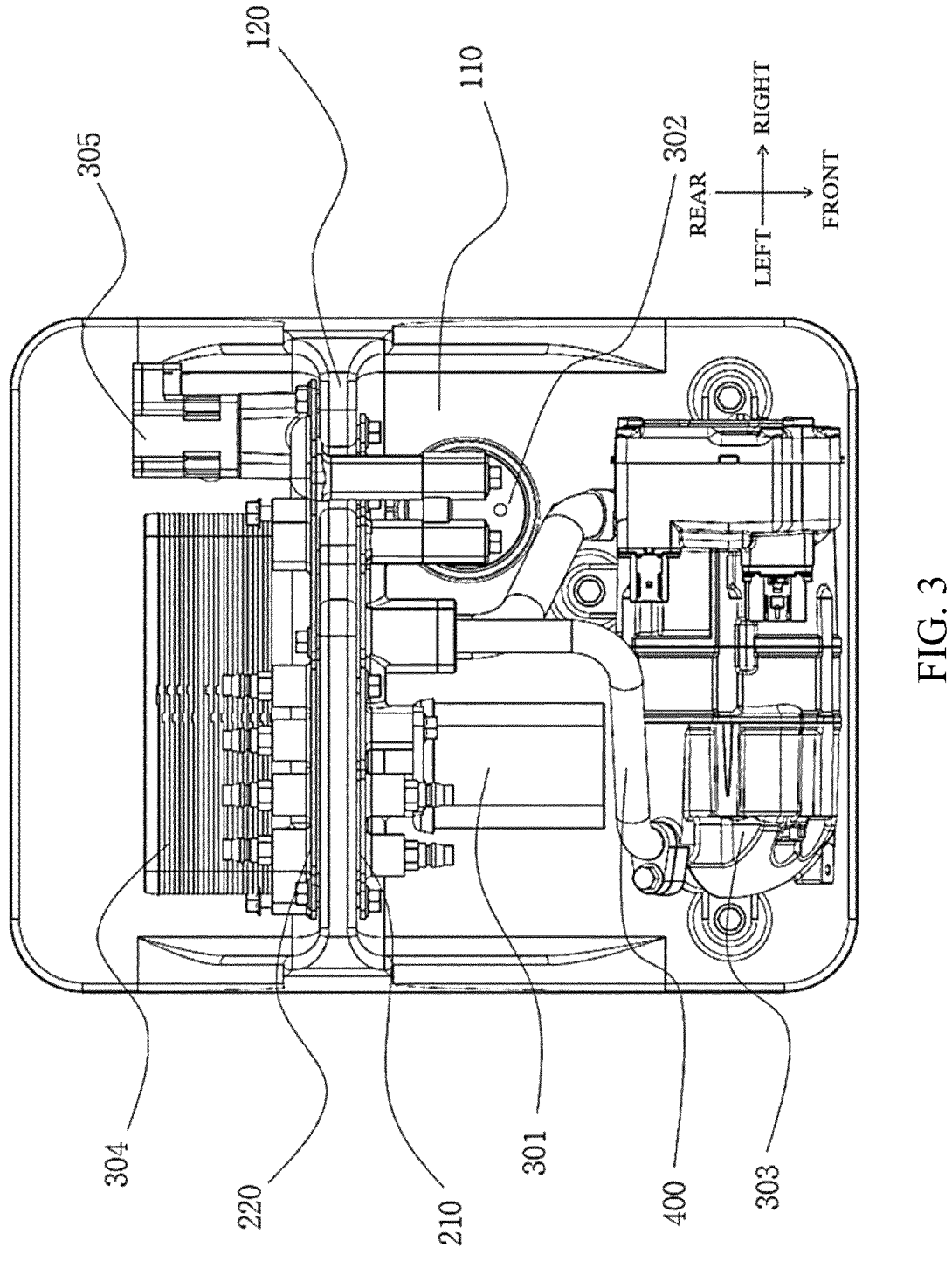
FIG. 3 is a top plan view illustrating the heat exchange module in FIG. 1 when viewed from the top side.
Figure 4:
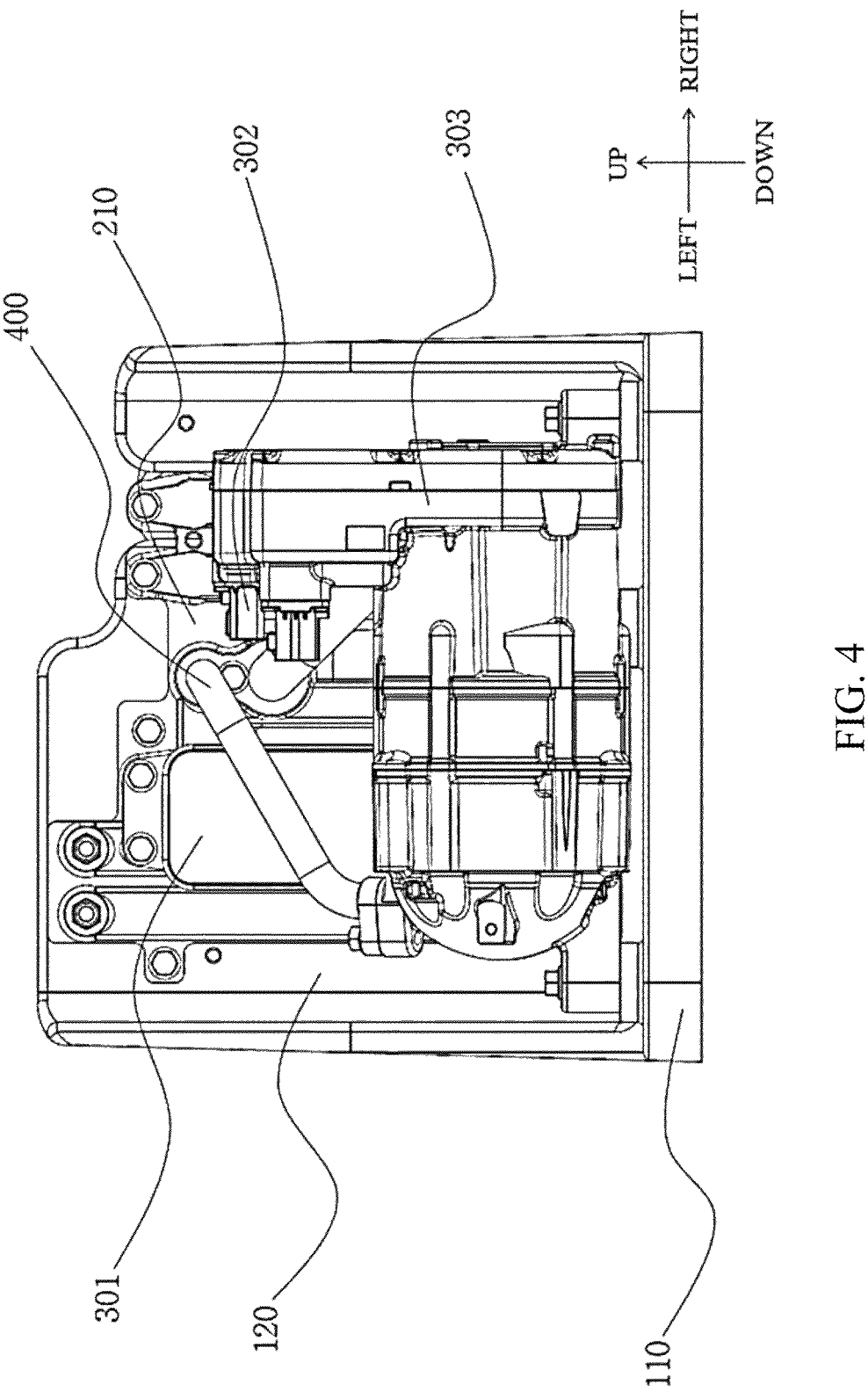
FIG. 4 is a front view illustrating the heat exchange module in FIG. 1 when viewed from the front side.
Figure 5:
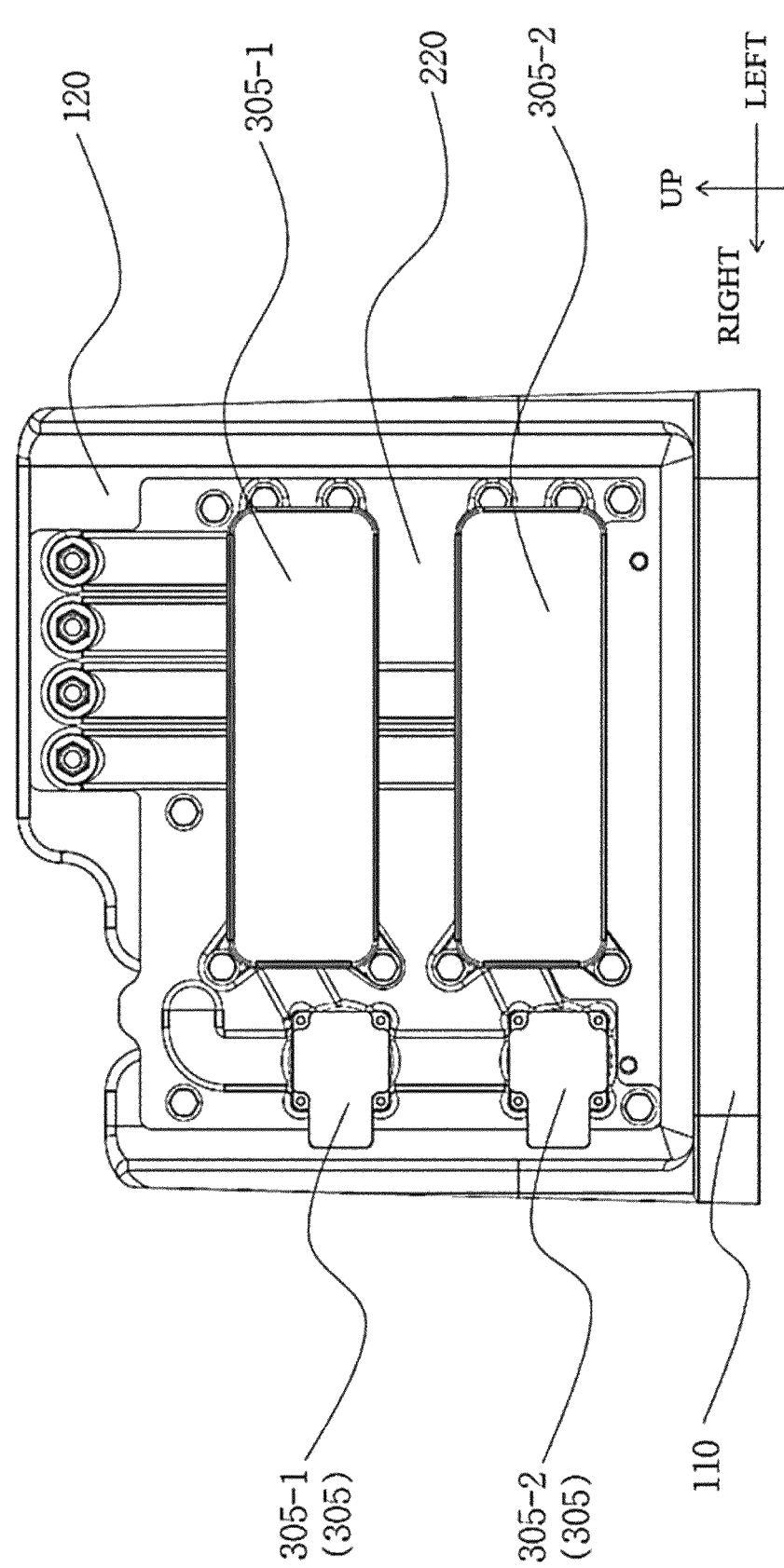
FIG. 5 is a rear view illustrating the heat exchange module in FIG. 1 when viewed from the rear side.

FIG. 1 is a perspective view illustrating a heat exchange module according to an example of the present invention when viewed from the front side, FIG. 2 is a perspective view illustrating the heat exchange module in FIG. 1 when viewed from the rear side, FIG. 3 is a top plan view illustrating the heat exchange module in FIG. 1 when viewed from the top side, FIG. 4 is a front view illustrating the heat exchange module in FIG. 1 when viewed from the front side, and FIG. 5 is a rear view illustrating the heat exchange module in FIG. 1 when viewed from the rear side.

As illustrated, a heat exchange module 10 of the present invention may broadly include a bracket 100, manifolds 200, and heat exchange components 300.

First, in the present invention, the heat exchange components 300 mean various types of constituent elements applied to a vehicle cooling system. For example, the components of the present invention may include a water-cooled condenser 301, an accumulator 302, a compressor 303, a chiller 304, and an expansion valve 305.

The water-cooled condenser is a heat exchanger configured to condense a gaseous refrigerant into a liquid refrigerant by using a coolant, and the accumulator is a liquid separator configured to separate the liquid refrigerant and the gaseous refrigerant. The compressor is configured to compress and deliver the refrigerant, and the chiller is a heat exchanger configured to remove heat from the liquid refrigerant. The expansion valve is a valve configured to vaporize the liquid refrigerant by increasing a pressure of the liquid refrigerant.

As described below, the components 300 are mounted on the bracket 100 or the manifold 200 and constitute the heat exchange module 10. In this case, the components 300 are each mounted to be fluidly connected to a flow path formed in the manifold 200, and the flow path allows the refrigerant or coolant to flow therethrough. More specifically, the components 300 are mounted to communicate with ports corresponding to the components 300 among the ports formed in the manifolds 200 and configured to communicate with the flow paths, such that the components 300 may communicate with the flow paths. In this case, the manifolds 200 may include a first manifold 210 and a second manifold 220. Therefore, the ports may include a first port 214 provided in the first manifold 210, and a second port 224 provided in the second manifold 220. The components 300 may each be coupled to at least any one of the first port 214 and the second port 224 and communicate with the flow path. The further details will be described below.

The manifolds 200 provide the flow paths through which the refrigerant or coolant may flow between the heat exchange components 300. More specifically, the flow path, through which the refrigerant or coolant, i.e., at least one of the refrigerant and the coolant may flow, may be formed in the manifold 200. As described above, the heat exchange components 300 may communicate with the flow paths of the manifolds 200.

Figure 6:
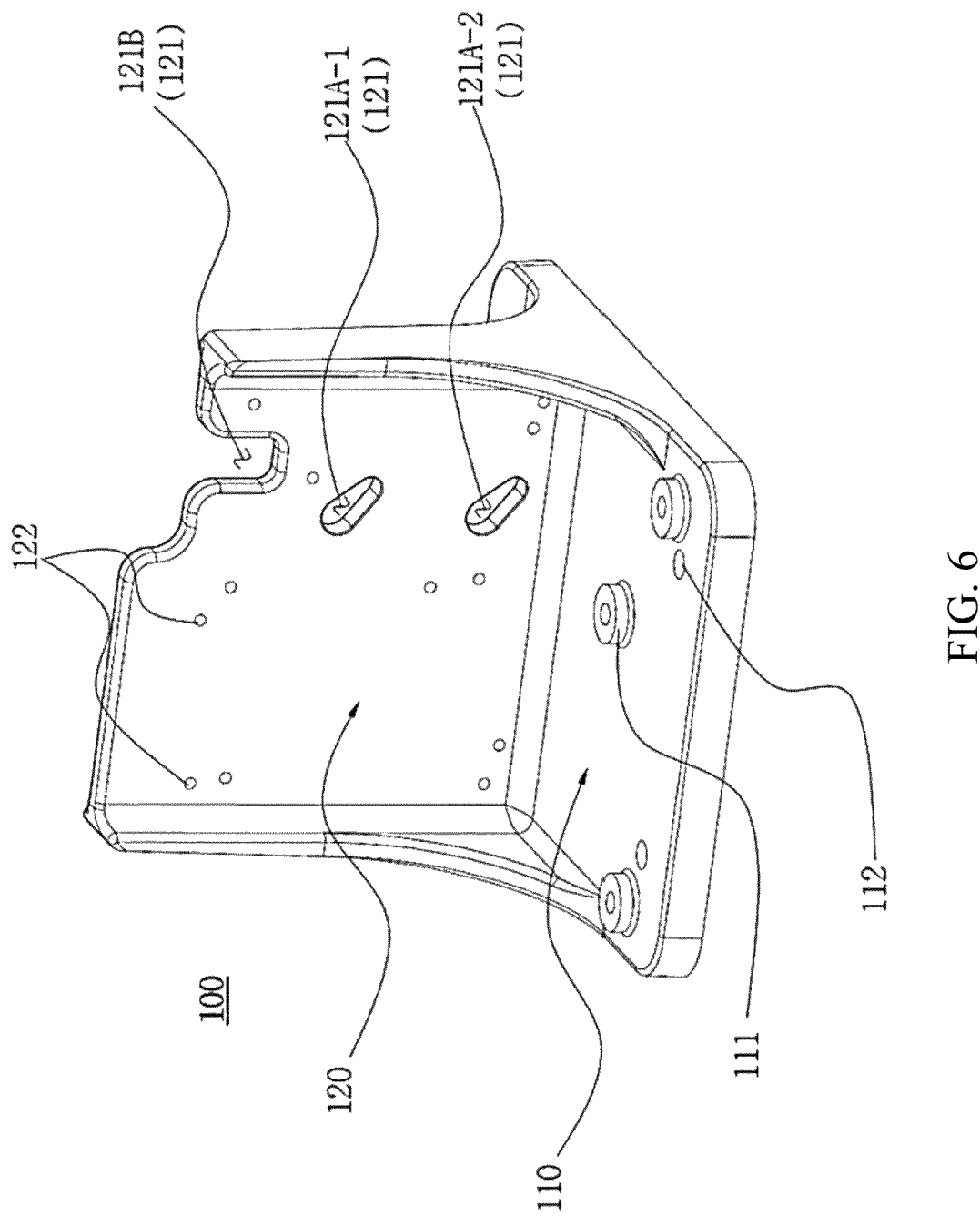
FIG. 6 is a perspective view illustrating a bracket according to the example of the present invention when viewed from the front side.
Figure 7:
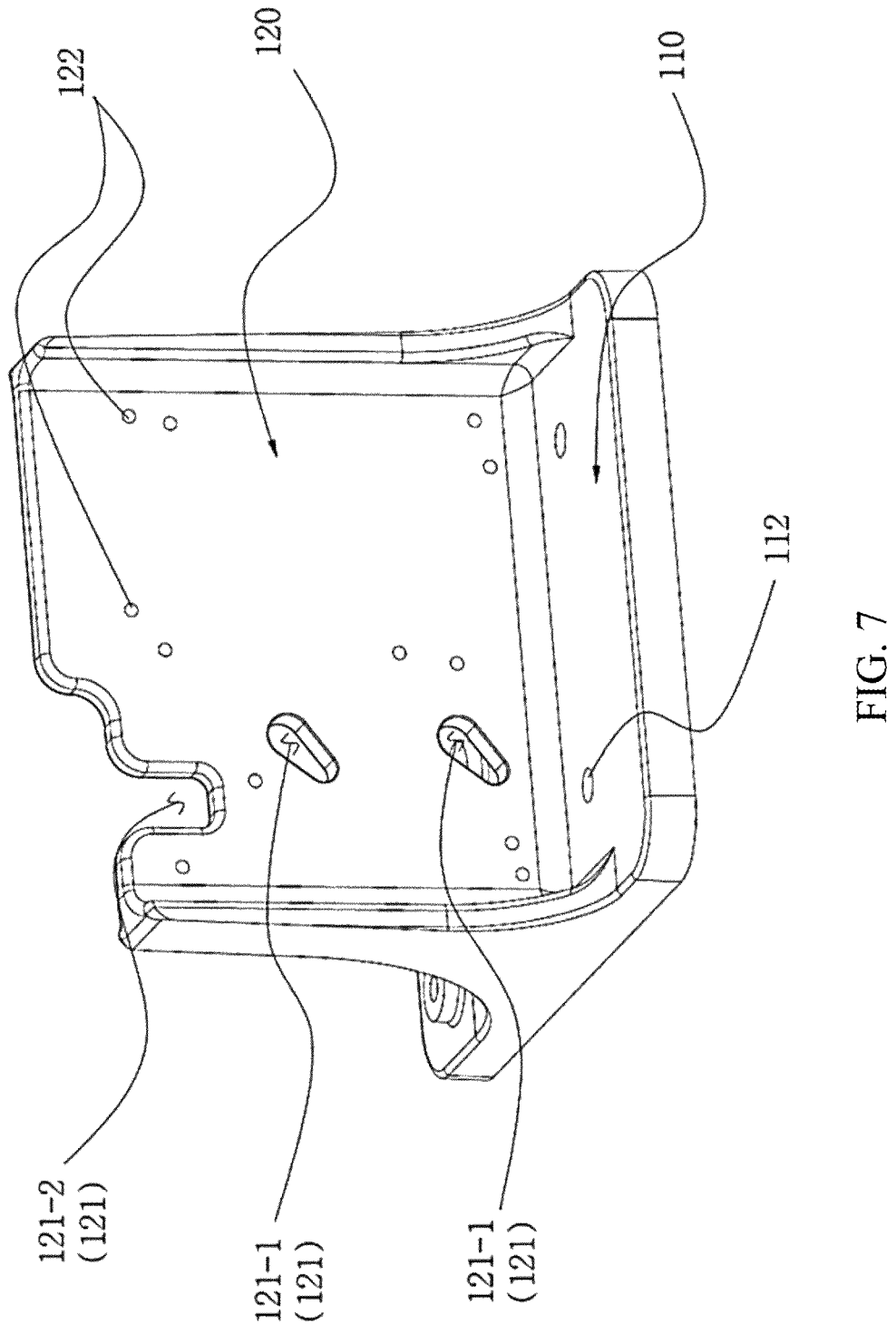
FIG. 7 is a perspective view illustrating the bracket in FIG. 6 when viewed from the rear side.

The bracket 100 provides a mounting structure on which the manifolds 200 and the heat exchange components 300 may be mounted. FIG. 6 is a perspective view illustrating the bracket according to the example of the present invention when viewed from the front side, and FIG. 7 is a perspective view illustrating the bracket in FIG. 6 when viewed from the rear side. The bracket 100 of the present invention may broadly include a bottom portion 110 configured to define a bottom, and a wall portion 120 extending upward from the bottom portion 110 and configured to define a wall.

In this case, as illustrated in FIGS. 1 to 5, the heat exchange components 300 of the heat exchange module 10 of the present invention are respectively disposed at front and rear sides based on the wall portion 120. In other words, at least some of the heat exchange components 300, e.g., the water-cooled condenser 301, the accumulator 302, and the compressor 303 may be provided forward of the wall portion 120 and disposed on the bottom portion 110, and at least some of the remaining heat exchange components 300, e.g., the chiller 304 and the expansion valve 305 may be provided rearward of the wall portion 120 and disposed on the bottom portion 110.

According to the present invention described above, the bracket includes the bottom portion and the wall portion, and the components and the manifold may be fixedly mounted by using the bottom portion and the wall portion, such that the module may be conveniently assembled, and the entire module may be miniaturized. In addition, the performance in packaging the constituent elements may be improved by using both front and rear surfaces of the wall portion. To this end, as illustrated, the wall portion may be installed on a central portion of the bottom portion instead of an edge of the bottom portion.

Figures 8A, 8B:
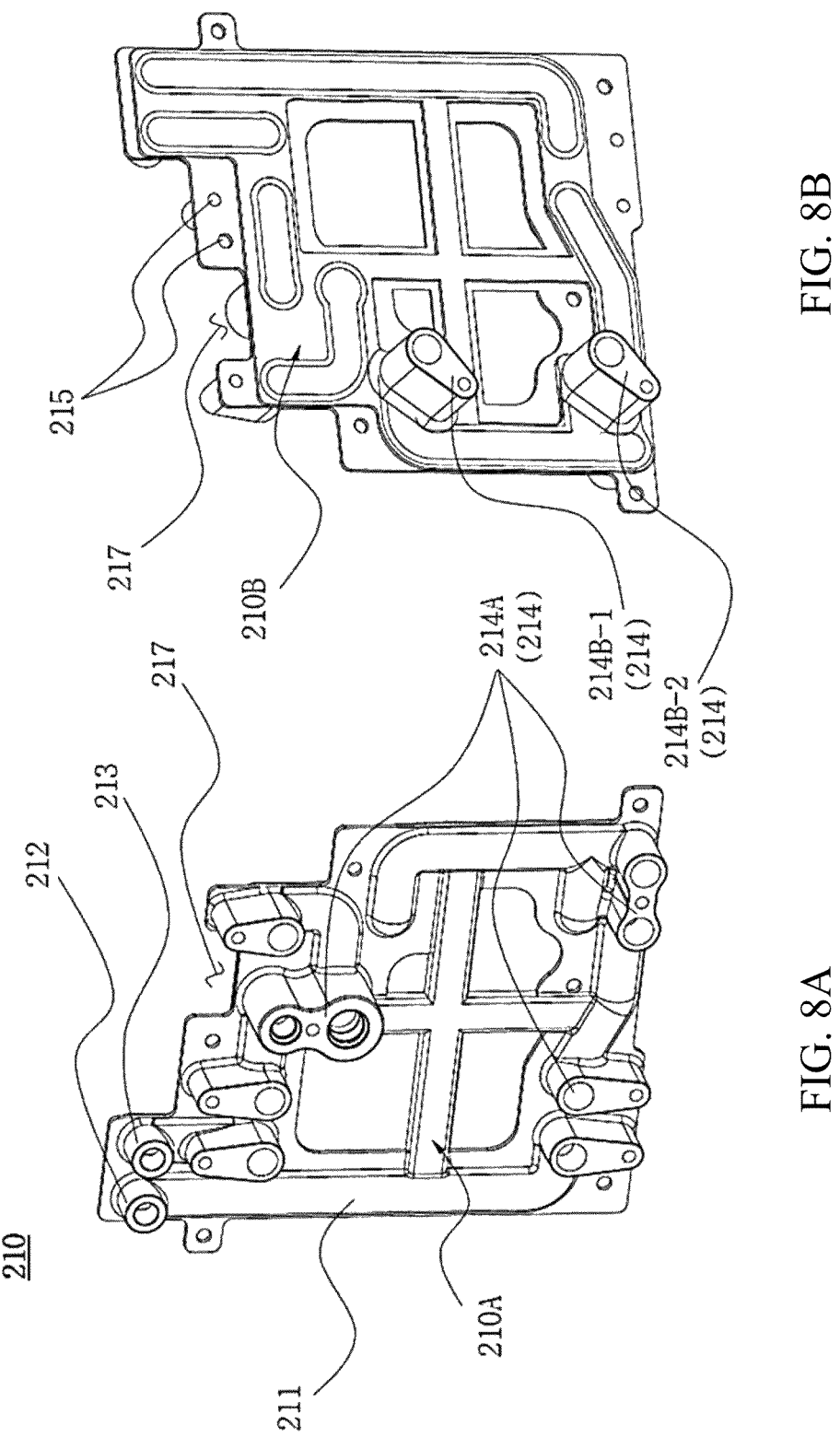
FIG. 8 is a view illustrating a first manifold according to the example of the present invention.
Figures 9A, 9B:
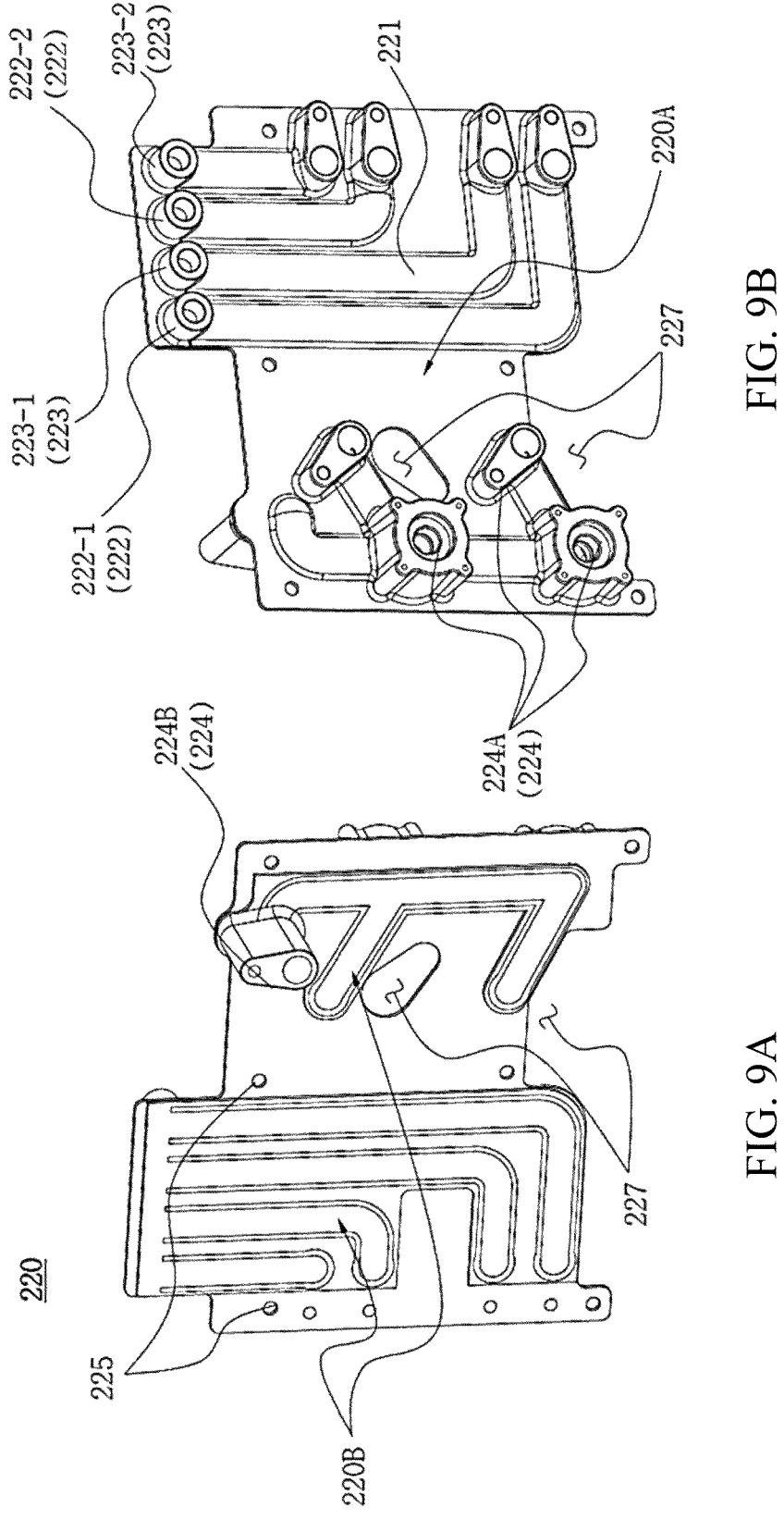
FIG. 9 is a view illustrating a second manifold according to the example of the present invention.
Figure 10:
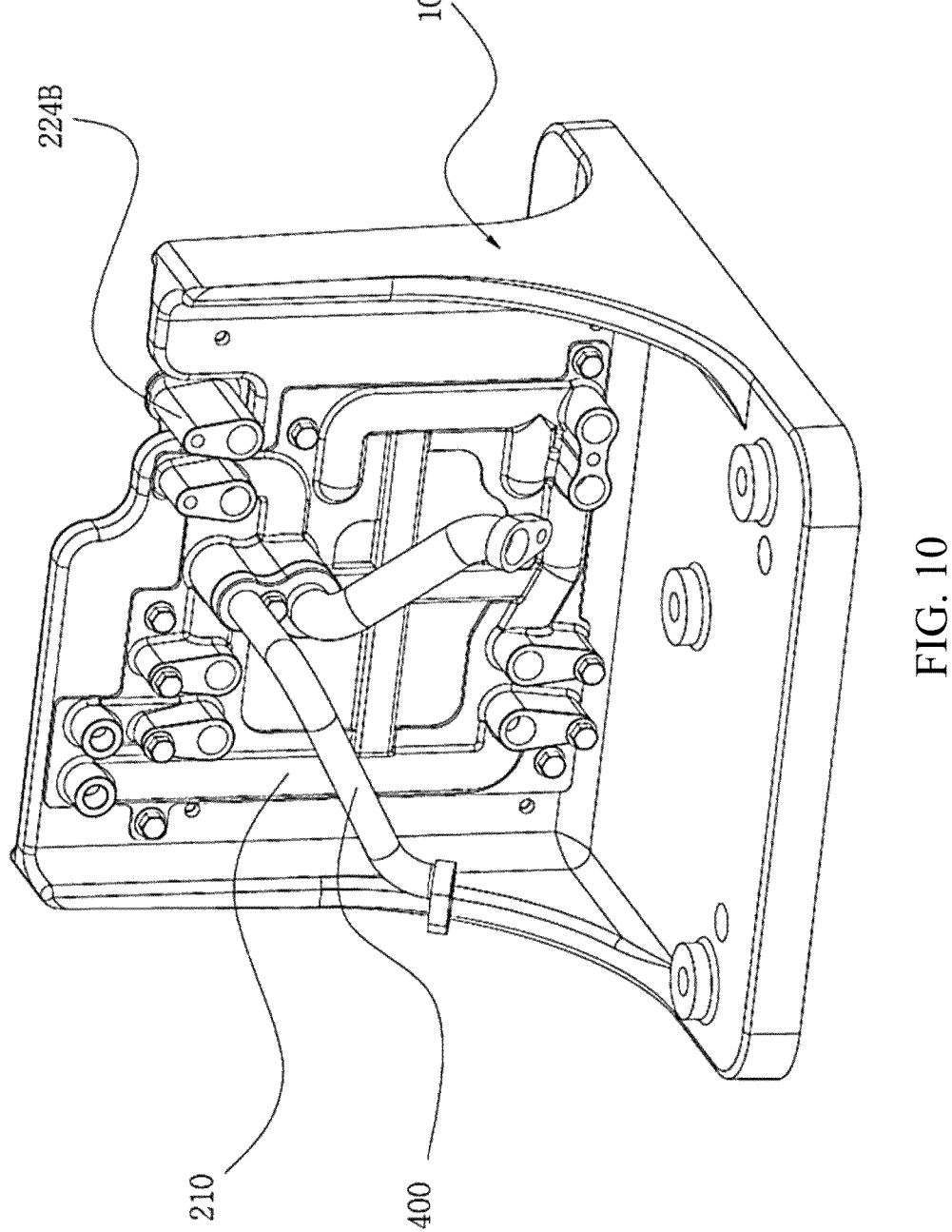
FIG. 10 is a perspective view illustrating the bracket on which the first manifold is mounted when viewed from the front side.
Figure 11:
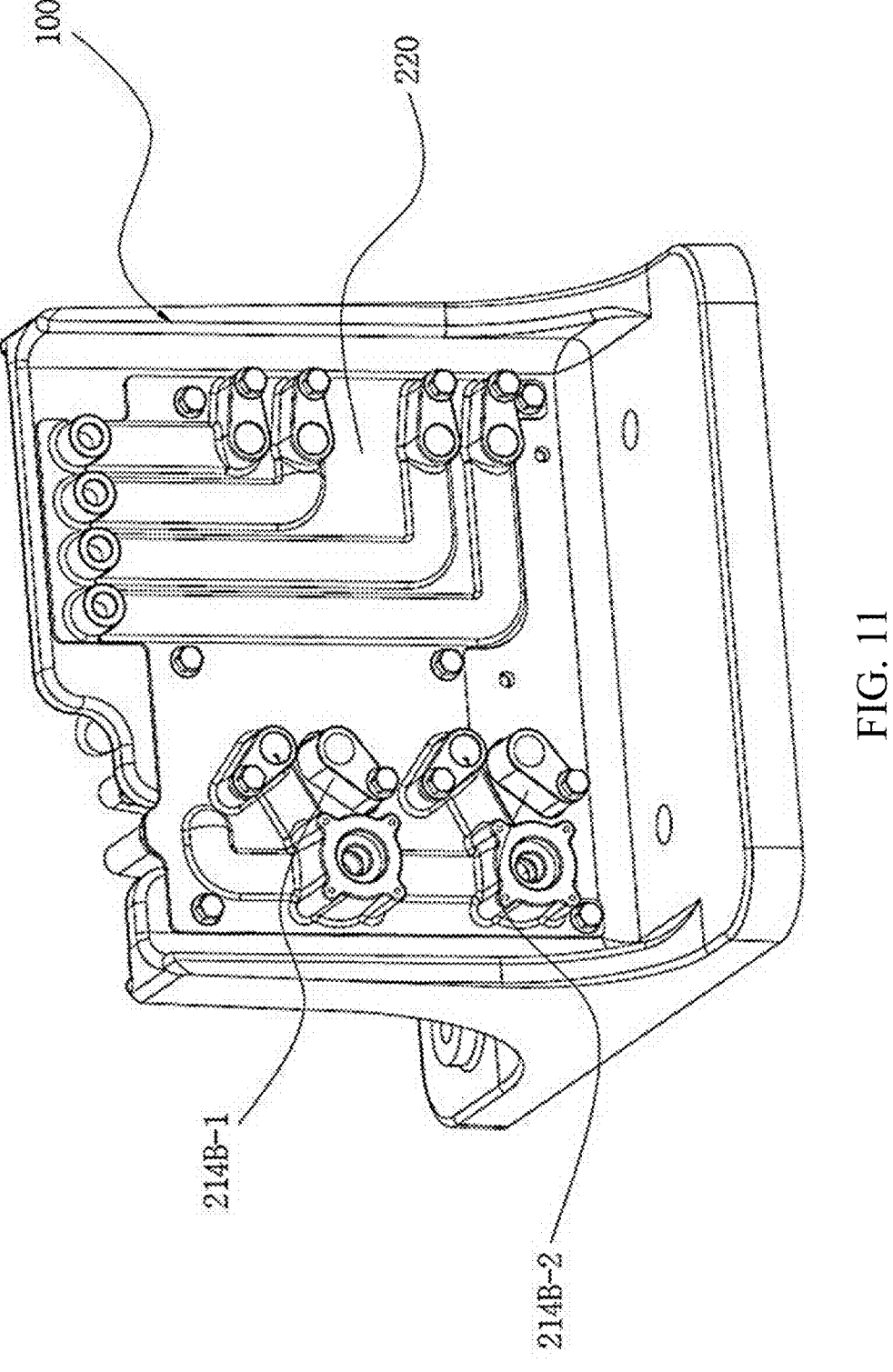
FIG. 11 is a perspective view illustrating the bracket on which the second manifold is mounted when viewed from the rear side.

The manifold 200 of the present invention may have a flat plate shape. More specifically, FIG. 8 is a view illustrating the first manifold according to the example of the present invention, in which FIG. 8A is a perspective view illustrating a front side of the first manifold, and FIG. 8B is a perspective view illustrating a rear side of the first manifold. FIG. 9 is a view illustrating the second manifold according to the example of the present invention, in which FIG. 9A is a perspective view illustrating a rear side of the second manifold, and FIG. 9B is a perspective view illustrating a front side of the second manifold. As illustrated, the manifold 200 may include the plate-shaped first manifold 210 having a first flow path 211 formed therein, and the second manifold 220 having a second flow path 221 formed therein. The first flow path 211 and the second flow path 221 correspond to a part of the flow path through which the refrigerant or coolant flows in the manifolds. Meanwhile, although not illustrated separately, at least a partial region of at least one of the first and second flow paths 211 and 221 may have a branch pipe structure in which a plurality of unit flow paths overlap one another. Further, the first and second manifolds 210 and 220 may be structured to be stacked on each other with the wall portion 120 interposed therebetween. That is, FIG. 10 is a perspective view illustrating the bracket on which the first manifold is mounted when viewed from the front side, and FIG. 11 is a perspective view illustrating the bracket on which the second manifold is mounted when viewed from the rear side. As illustrated, the first manifold 210 may be coupled to the front surface of the wall portion 120 of the bracket 100, and the second manifold 220 may be coupled to the rear surface of the wall portion 120 of the bracket 100.

Further, as described above, at least some of the components 300 mounted forward of the wall portion 120, e.g., the water-cooled condenser 301 and the accumulator 302 may be mounted directly on the front surface of the first manifold 210, and at least some of the components 300 mounted rearward of the wall portion 120, e.g., the chiller 304 and the expansion valve 305 may be mounted directly on the front surface of the second manifold 220.

Because the two plate-shaped manifolds, i.e., the first and second manifolds, are separated and mounted on the front and rear surfaces of the wall portion as described above, complicated pipes may be eliminated, and the plurality of components may be mounted directly on the manifolds each having a large plate shape, such that the heat exchange module may be more compressively packaged. In addition, because the two plate-shaped manifolds are mounted on the bracket, the bracket may directly support weights of the manifolds and a weight of the refrigerant or coolant flowing in the manifolds, which is advantageous in terms of noise, vibration, and durability.

With reference back to FIG. 8, the first manifold 210 may have a plurality of ports 214 on which the external components 300 are mounted so that the components 300 are fluidly connected to the first flow path 211. The ports 214 may include ports 214A structured to be formed in the front surface of the first manifold 210, and ports 214B structured to be formed in the rear surface of the first manifold 210. In this case, the port 214B structured to be formed in the rear surface will be referred to as a first port 214B. That is, the first manifold 210 may have the one or more first ports 214B structured to communicate with the first flow path 211 and protrude rearward to a predetermined degree from the rear surface of the first manifold 210. In the illustrated example, the first ports 214B may be provided as two first ports 214B-1 and 214B-2.

Further, the wall portion 120 and the second manifold 220 may have penetration structures 121 and 227 that penetrate the wall portion 120 and the second manifold 220 so that the first ports 214B may penetrate the wall portion 120 and the second manifold 220. More specifically, as illustrated in FIGS. 6 and 7, through-holes 121A-1 and 121A-2 may be formed through the wall portion 120 and correspond to positions of the first and second port 214B-1 and 214B-2. As illustrated in FIG. 9, the penetration structures 227 may be formed in the second manifold 220 and correspond to the positions of the first and second ports 214B-1 and 214B-2, and the penetration structures 227 may each be provided in the form of a hole and penetrate the second manifold 220 or may not be blocked by the second manifold 220.

Therefore, even when the first manifold 210 is mounted on the front surface of the wall portion 120, the first port 214B, which protrudes rearward from the rear surface of the first manifold 210, may protrude rearward from the wall portion 120 while penetrating the corresponding penetration structure, and at least some of the components 300 disposed rearward of the wall portion 120, e.g., the chiller 304 may be coupled directly to the first port 214B and communicate directly with the first flow path 211 of the first manifold 210 through the first port 214B.

With the penetration structure, the component disposed rearward of the wall portion may communicate with the first flow path provided forward of the wall portion, such that a flow line for the refrigerant or coolant may be more flexibly designed, and the component may communicate directly with the first flow path without an additional structure such as a valve, thereby further improving the spatial utilization and the integration of the entire module.

Likewise, the second manifold 220 may have the second ports 224B formed in the rear surface thereof, and the wall portion 120 and the first manifold 210 may have penetration structures 121 and 217 corresponding to the second ports 224B. More specifically, with reference back to FIG. 9, the second manifold 220 may have a plurality of ports 224 on which the external components 300 are mounted so that the components 300 are fluidly connected to the second flow path 221. The ports 224 may include ports 224A structured to be formed in the front surface of the second manifold 220, and a port 224B structured to be formed in the rear surface of the second manifold 220. In this case, the port 224B structured to be formed in the rear surface will be referred to as a second port 224B. That is, the second manifold 220 may have the one or more second ports 224B structured to communicate with the second flow path 221 and protrude rearward to a predetermined degree from the rear surface of the second manifold 220. In the illustrated example, the single second port 224B may be provided.

Further, the wall portion 120 and the first manifold 210 may have penetration structures that penetrate the wall portion 120 and the first manifold 210 so that the second port 224B may penetrate the wall portion 120 and the first manifold 210. More specifically, as illustrated in FIGS. 6 and 7, a penetration structure 121B, which is not blocked by the wall portion 120, may be formed in the wall portion 120 and correspond to the position of the second port 224B. As illustrated in FIG. 8, a penetration structure 217, which is not blocked by the first manifold 210, may be formed in the first manifold 210 and correspond to the position of the second port 224B.

Therefore, even when the second manifold 220 is mounted on the rear surface of the wall portion 120, the second port 224B, which protrudes forward from the rear surface of the second manifold 220, may protrude forward from the wall portion 120 while penetrating the corresponding penetration structure, and at least some of the components 300 disposed forward of the wall portion 120, e.g., the accumulator 302 may be coupled directly to the second port 224B and communicate directly with the second flow path 221 of the second manifold 220 through the second port 214B. The penetration structure related to the second manifold may contribute to the miniaturization and integration of the entire module.

With reference back to FIGS. 8 and 9, the first manifold 210 may have at least one first inlet port 212 through which the refrigerant or coolant is introduced from the outside, and at least one first discharge port 213 through which the refrigerant or coolant is discharged to the outside, and the second manifold 220 may have at least one second inlet port 222 through which the refrigerant or coolant is introduced from the outside, and at least one second discharge port 223 through which the refrigerant or coolant is discharged to the outside. In an illustrated example, the single first inlet port 212 and the single first discharge port 213 are provided, and the two second inlet ports 222 and the two second discharge ports 223 are provided.

In this case, as illustrated, the first inlet port 212 and the first discharge port 213 may be provided on an upper portion of the first manifold 210, and the second inlet port 222 and the second discharge port 223 may be provided on an upper portion of the second manifold 220. That is, as described above, the first manifold 210 and the second manifold 220 may be respectively mounted on the front and rear surfaces of the wall portion 120. Therefore, both the inlet port and the discharge port of the first manifold may be positioned at the upper side of the module, and both the inlet port and the discharge port of the second manifold may be positioned at the upper side of the module. This may provide ease of assembly at the time of configuring the heat exchange module.

With reference back to FIG. 8, the first manifold 210 may have a structure in which a first front surface plate 210A and a first rear surface plate 210B are stacked and coupled. More specifically, the first front surface plate 210A may be a plate in which the first flow path 211 is recessed forward from the rear surface, and the first rear surface plate 210B may be a flat plate. The first rear surface plate 210B may be stacked on and coupled to the rear surface of the first front surface plate 210A, such that the first flow path 211 may be defined between the first rear surface plate 210B and the first front surface plate 210A.

In this case, the first front surface plate 210A and the first rear surface plate 210B may be integrally manufactured first by brazing. Thereafter, the rear surface of the first manifold 210 may be disposed to adjoin the front surface of the wall portion 120 and coupled to the front surface of the wall portion 120 by bolting. To this end, bolt grooves 122 and 215 may be respectively formed in the wall portion 120 and the first manifold 210.

Because the first manifold is manufactured by brazing as described above, the structural durability of the first manifold may be ensured. Because the first manifold is coupled to the wall portion by bolting, the module may be conveniently assembled.

Likewise, the second manifold 220 may also have a structure in which a second front surface plate 220A and a second rear surface plate 220B are stacked and coupled. More specifically, with reference back to FIG. 9, the second front surface plate 220A may be a plate in which the second flow path 221 is recessed forward from the rear surface, and the second rear surface plate 220B may be a flat plate. The second rear surface plate 220B may be stacked on and coupled to the rear surface of the second front surface plate 220A, such that the second flow path 221 may be defined between the second rear surface plate 220B and the second front surface plate 220A. In addition, the second front surface plate 220A and the second rear surface plate 220B may be integrally manufactured first by brazing. Thereafter, the rear surface of the second manifold 220 is disposed to adjoin the rear surface of the wall portion 120 and coupled to the rear surface of the wall portion 120 by bolting. To this end, bolt grooves 122 and 215 may be respectively formed in the wall portion 120 and the second manifold 220. The function and effect of this configuration are as described above.

With reference back to FIGS. 6 and 7, at least one bolt groove 111 is formed in the bottom portion 110 of the bracket 100, and at least one of the heat exchange components 300, e.g., the compressor 303 may be coupled to the bottom portion 110 of the bracket by bolting through the bolt groove.

That is, as described above, at least some of the heat exchange components 300 of the heat exchange module 10 of the present invention may be mounted on the manifold 200, and at least some of the remaining heat exchange components 300 may be mounted on the bracket 100. In this case, the heat exchange component 300 mounted on the manifold 200 may communicate directly with the flow path of the manifold 200 through the port of the manifold 200. However, the heat exchange component 300 mounted on the bracket 100 may be fluidly connected to the flow path of the manifold 200 through a hose 400, unlike the heat exchange component 300 mounted on the manifold 200.

As described above, in the present invention, the bracket includes the bottom portion and the wall portion, and both the bottom portion and the wall portion are used to define the mounting space for the components. Therefore, the packaging performance may be improved, the modularization may be implemented, and the entire module may be conveniently mounted because the integrated module only needs to be mounted in the vehicle body.

In addition, a bolt hole 112 for mounting the bracket 100 in the vehicle body may be formed in the bottom portion 110 of the bracket 100, and thus the module may be conveniently mounted because the bracket only needs to be mounted in the vehicle body. A vibration-insulating material, e.g., an insulator may be applied by using the bolt hole at the time of mounting the bracket, thereby mitigating vibration of the entire module.

Hereinafter, a specific embodiment related to the heat exchange components will be described.

With reference back to FIGS. 1 to 5, in the heat exchange module 10 of the present invention, the water-cooled condenser 301, the accumulator 302, and the compressor 303 may be disposed forward of the wall portion 120, and the two or more chillers 304 may be disposed rearward of the wall portion 120. In an illustrated example, the two chillers are respectively referred to as a first chiller 303-1 and a second chiller 303-2. In addition, the two or more expansion valves 305 may be disposed rearward. In an illustrated example, the two expansion valves 305 are respectively referred to as a first expansion valve 304-1 and a second expansion valve 304-2.

In this case, the water-cooled condenser 301 and the accumulator 302 may be mounted directly on the first manifold 210, the compressor 303 may be mounted directly on the bottom portion 110 of the bracket 100, and the first and second chillers 304-1 and 304-2 and the first and second expansion valves 305-1 and 305-2 may be mounted directly on the second manifold 220.

The distribution of the heat exchange components is set in consideration of the weight. The front and rear sides of the module based on the wall portion have similar weights, thereby minimizing the NVH caused by vibration. In order to implement the above-mentioned weight distribution, the wall portion 120 of the bracket 100 may be positioned to be biased toward one side from a center of the bottom portion 110. In addition, at the same time, the compressor and the condenser, which have relatively high temperatures, may be disposed forward, and the chillers, which have relatively low temperatures, may be distributed and disposed on the rear surface, such that it is possible to minimize a loss caused by heat interference between the heat exchangers.

Further, as described above, in the present invention, the manifold and the wall portion may have the penetration structures, such that the heat exchange components at the front and rear sides and the flow paths at the front and rear sides may be connected to and intersect one another.

That is, with reference to FIGS. 1 to 5, the accumulator 302 may include a first entrance/exit port 302A and a second entrance/exit port 302B. In this case, the first entrance/exit port 302A of the accumulator 302 may be coupled directly to the first manifold 210 and communicate directly with the first flow path 211. The second entrance/exit port 302B of the accumulator 302 may protrude from the second port 224B, i.e., the rear surface of the second manifold 220 and coupled directly to the second port 224B, which penetrates the wall portion 120 forward through the penetration structure penetrating the wall portion 120 and the first manifold 210, and the second entrance/exit port 302B may communicate directly with the second flow path 221.

In addition, the first and second chillers 304-1 and 304-2 may protrude from the first ports 214B, i.e., the rear surface of the first manifold 210 and coupled directly to the two first ports 214B-1 and 214B-2, which penetrate the wall portion 120 rearward through the penetration structure penetrating the wall portion 120 and the second manifold 220, and the first and second chillers 304-1 and 304-2 may communicate directly with the first flow path 211.

Further, as described above, the compressor 303 may be mounted directly on the bottom portion 110 of the bracket 100 and fluidly connected to the first flow path 211 of the first manifold 210 through the hose 400.

FIG. 12 is a view illustrating a flow of a refrigerant/coolant according to the example of the present invention, in which FIG. 12A is a top plan view of the heat exchange module, FIG. 12B is a front view illustrating a state in which the compressor is excluded from the heat exchange module, FIG. 12C is a rear view illustrating the heat exchange module, and FIG. 12D is a right side view illustrating a state in which the bracket is excluded from the heat exchange module. As illustrated, (1) the refrigerant compressed by the compressor is introduced into the water-cooled condenser, (2) the high-pressure refrigerant, which is cooled in the water-cooled condenser, exchanges heat with the low-temperature refrigerant, which fills the interior of the accumulator (dual-pipe heat exchange-type accumulator), while flowing upward through a pipeline in the accumulator, (3) the high-pressure refrigerant, which has exchanged heat and flown upward in the accumulator, is introduced into the second manifold on the rear surface, and (4) the high-pressure refrigerant introduced into the manifold on the rear surface is divided and flows to the first and second expansion valves through the branch pipe formed in the second flow path. In this case, the first and second expansion valves may be controlled to be opened, as necessary, for interior cooling, battery cooling, simultaneous cooling, and the like. (5) Thereafter, the refrigerant, which has exchanged heat in the first and second chillers, may be introduced back into the first manifold on the front surface, and (6) the flow paths separated to exchange heat in the first and second chillers are merged into a single flow path again such that the refrigerant may be introduced into the accumulator and fill the interior of the accumulator. (7) Thereafter, the refrigerant having passed through the accumulator may be introduced into the compressor and compressed.

Figure 13:
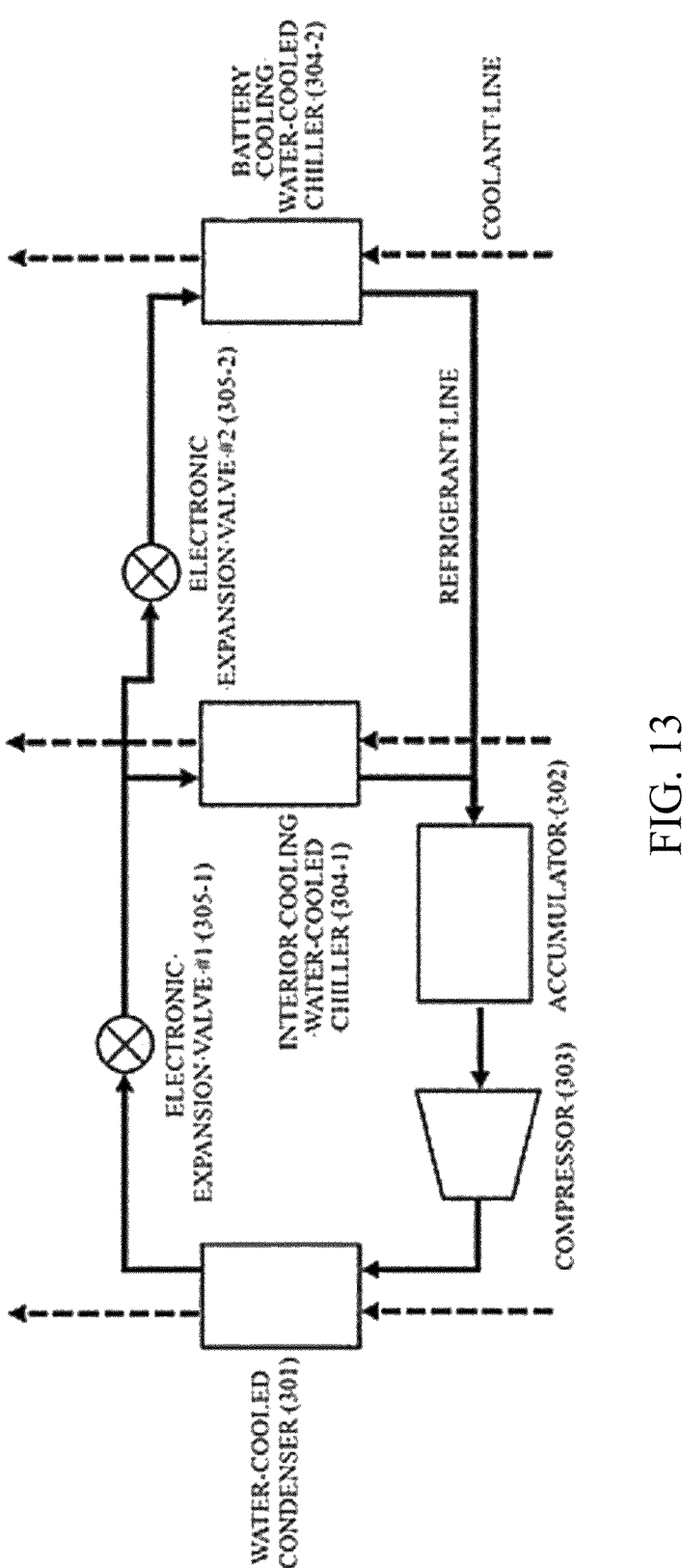
FIG. 13 is a view illustrating a cooling circuit diagram according to the example of the present invention.

In addition, a first inlet port (a) and a first discharge port (b) of the second manifold may be connected to a battery cooler and introduce the coolant, which is heated by the battery cooler, or discharge the cooled coolant to the battery cooler. A second inlet port (c) and a second discharge port d) of the second manifold may be connected to the evaporator and introduce the coolant, which is heated by the evaporator, or discharge the cooled coolant to the evaporator. A first inlet port (e) and a first discharge port (f) of the first manifold may be connected to an internal condenser (IHX) and introduce the coolant, which is cooled by the internal condenser, or discharge the heated coolant to the internal condenser. FIG. 13 is a view illustrating a cooling circuit diagram according to the example of the present invention and illustrates the flow of the refrigerant/coolant.

Figure 14:
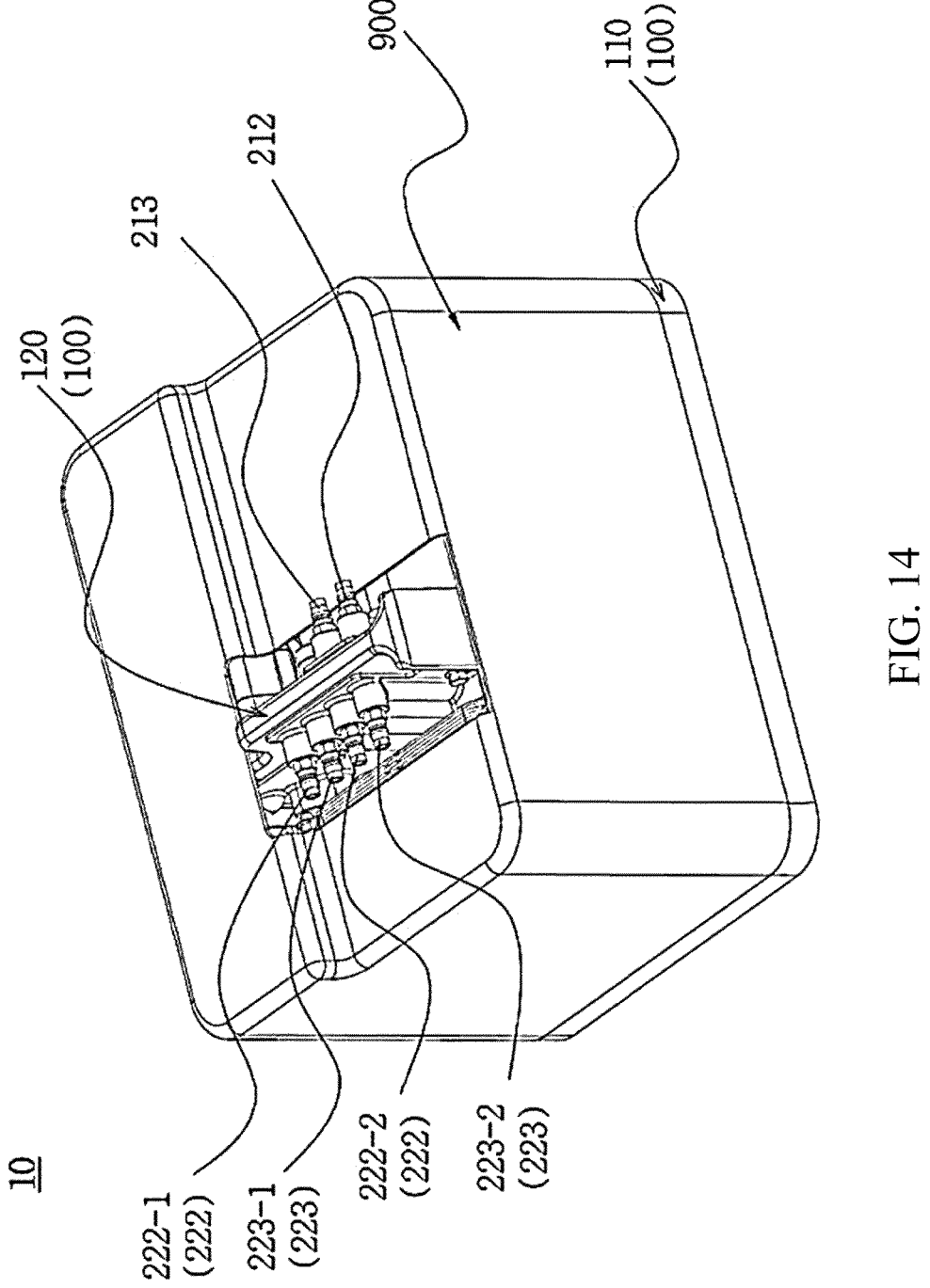
FIG. 14 is a view illustrating a heat exchange module equipped with a casing.

FIG. 14 is a view illustrating the heat exchange module equipped with a casing. As illustrated, the heat exchange module 10 may further include a casing 900. The casing 900 corresponds to an outer peripheral housing. The casing 900 may serve to accommodate the heat exchange components 300 therein and close the heat exchange components 300 from the outside. The casing 900 may have a size corresponding to the bracket 100 and be structured to be coupled to the bracket 100. Although not illustrated, the bracket 100 may, of course, have a predetermined coupling structure for coupling the bracket 100 to the casing 900.

In this case, as illustrated, a part of the upper side of the casing 900 may be opened. The refrigerant/coolant entrance/exit ports of the manifold 200, more specifically, the first inlet port 212 and the first discharge port 213 of the first manifold 210 and first inlet ports 222-1 and 222-2 and second inlet ports 223-1 and 223-2 of the second manifold 220 may penetrate the opened portion and be disposed outside the casing 900. This may be designed by disposing the entrance/exit ports of the manifold on the upper portion of the manifold as described above. Therefore, the entire cooling circuit may be completely implemented in the vehicle by mounting the heat exchange modules of the present invention in the vehicle body and then simply connecting the entrance/exit ports of the corresponding manifolds by means of the hoses, such that the heat exchange module may be very conveniently mounted and assembled in the vehicle body.

According to the present invention described above, the bracket includes the bottom portion and the wall portion, the plate-shaped manifold is mounted on the wall portion, and the heat exchange components are separated and disposed at the front and rear sides based on the wall portion, such that the vehicle heat exchange module may be miniaturized, advantageous in terms of NVH, and easily mounted in the vehicle body.

While the embodiments of the present invention have been described with reference to the accompanying drawings, those skilled in the art will understand that the present invention may be carried out in any other specific form without changing the technical spirit or an essential feature thereof. Therefore, it should be understood that the above-described embodiments are illustrative in all aspects and do not limit the present invention.

DESCRIPTION OF REFERENCE NUMERALS

10: Heat exchange module
100: Bracket
110: Bottom portion
111: Bolt groove of bottom portion
112: Bolt hole of bottom portion
120: Wall portion
121: Penetration structure of wall portion
122: Bolt groove
200: Manifold
210: First manifold
211: First flow path
212: First inlet port
213: First discharge port
214: First port
215: Bolt groove of first manifold
217: Penetration structure of first manifold
220: Second manifold
221: Second flow path
222: First inlet port
223: Second discharge port
224: Second port
225: Bolt groove of second manifold
227: Penetration structure of second manifold
300: Heat exchange component
301: Water-cooled condenser
302: Accumulator
303: Compressor
304: Chiller
305: Expansion valve
400: Hose
900: Casing

What is claimed is:

1. A heat exchange module comprising:
heat exchange components;
manifolds configured to provide flow paths through which a refrigerant or coolant flows between the heat exchange components; and
a bracket configured to provide a mounting structure in which the manifolds and the heat exchange components are mounted,
wherein the bracket comprises:
a bottom portion configured to define a bottom; and a wall portion extending upward from the bottom portion and configured to define a wall, wherein the heat exchange components are disposed separately at opposite sides of the wall portion, and are fluidly connected to the respective flow paths formed in the manifolds through the wall portion.

2. The heat exchange module of claim 1, wherein the wall portion is biased toward one side from a center of the bottom portion.

3. The heat exchange module of claim 1, wherein the bottom portion has a bolt hole for mounting the bottom portion in a vehicle body.

4. A heat exchange module comprising:

heat exchange components;

manifolds configured to provide flow paths through which a refrigerant or coolant flows between the heat exchange components; and a bracket configured to provide a mounting structure in which the manifolds and the heat exchange components are mounted, wherein the bracket comprises:

a bottom portion configured to define a bottom; and a wall portion extending upward from the bottom portion and configured to define a wall, wherein the heat exchange components are disposed separately at front and rear sides of the wall portion, wherein the manifolds comprise:

a plate-shaped first manifold having a first flow path formed therein; and a plate-shaped second manifold having a second flow path formed therein, wherein the first manifold is coupled to a front surface of the wall portion, and the second manifold is coupled to a rear surface of the wall portion.

5. The heat exchange module of claim 4, wherein at least some of the components mounted forward of the wall portion are mounted on the first manifold, and at least some of the components mounted rearward of the wall portion are mounted on the second manifold.

6. The heat exchange module of claim 4, wherein the first manifold has at least one first port configured to communicate with the first flow path and structured to protrude to a predetermined degree rearward from a rear surface of the first manifold, and the wall portion and the second manifold respectively have penetration structures that penetrate the wall portion and the second manifold so that the first port penetrates the wall portion and the second manifold.

7. The heat exchange module of claim 6, wherein at least some of the components mounted rearward are coupled directly to the first port and communicate directly with the first flow path through the first port.

8. The heat exchange module of claim 4, wherein the second manifold has at least one second port configured to communicate with the second flow path and structured to protrude to a predetermined degree rearward from a rear surface of the second manifold, and the wall portion and the first manifold respectively have penetration structures that penetrate the wall portion and the second manifold so that the second port penetrates the wall portion and the second manifold.

9. The heat exchange module of claim 8, wherein at least some of the components mounted forward are coupled directly to the second port and communicate directly with the second flow path through the second port.

10. The heat exchange module of claim 4, wherein the first manifold comprises:

at least one first inlet port through which the refrigerant or coolant is introduced from the outside; and at least one first discharge port through which the refrigerant or coolant is discharged to the outside, wherein the second manifold comprises:

at least one second inlet port through which the refrigerant or coolant is introduced from the outside; and at least one second discharge port through which the refrigerant or coolant is discharged to the outside, wherein the first inlet port and the first discharge port are positioned on an upper portion of the first manifold, and wherein the second inlet port and the second discharge port are positioned on an upper portion of the second manifold.

11. The heat exchange module of claim 4, wherein the first manifold has a structure in which a flat first rear surface plate is stacked on and coupled to a rear surface of a first front surface plate in which the first flow path is recessed, and the second manifold has a structure in which a flat second rear surface plate is stacked on and coupled to a rear surface of a second front surface plate in which the second flow path is recessed.

12. The heat exchange module of claim 4, wherein a rear surface of the first manifold is disposed to adjoin a front surface of the wall portion and coupled to the front surface of the wall portion by bolting, and a rear surface of the second manifold is disposed to adjoin a rear surface of the wall portion and coupled to the rear surface of the wall portion by bolting.

13. The heat exchange module of claim 4, wherein at least one bolt groove is formed in the bottom portion of the bracket, and at least some of the heat exchange components are coupled to the bottom portion of the bracket by bolting through the bolt groove.

14. The heat exchange module of claim 4, wherein at least some of the heat exchange components are mounted on the manifold and communicate directly with the flow path of the manifold, and at least some of the remaining heat exchange components are mounted on the bottom portion of the bracket and fluidly connected to the flow path of the manifold through a hose.

15. The heat exchange module of claim 4, wherein the heat exchange components comprise:

a water-cooled condenser, an accumulator, a compressor, and chillers, wherein the water-cooled condenser, the accumulator, and the compressor are disposed forward of the wall portion, and the chillers are provided as at least two chillers disposed rearward of the wall portion.

16. The heat exchange module of claim 15, wherein the water-cooled condenser and the accumulator are mounted directly on the first manifold, the compressor is mounted directly on the bottom portion of the bracket, and at least one chiller is mounted directly on the second manifold.

17. The heat exchange module of claim 16, wherein a first entrance/exit port of the accumulator is coupled to a port of the first manifold and communicates directly with the first flow path, a second entrance/exit port of the accumulator protrudes from a rear surface of the second manifold and is coupled directly to a second port penetrating the wall portion forward through a penetration structure penetrating the wall portion and the first manifold, and the second entrance/exit port communicates directly with the second flow path.

18. The heat exchange module of claim 16, wherein at least one chiller protrudes from a rear surface of the first manifold and is coupled directly to a first port penetrating the wall portion rearward through a penetration structure penetrating the wall portion and the second manifold, and communicates directly with the first flow path.

19. The heat exchange module of claim 16, wherein the compressor is fluidly connected to the first flow path of the first manifold through a hose.

20. The heat exchange module of claim 4, wherein at least a partial region of at least one of the first and second flow paths has a branch pipe structure in which a plurality of unit flow paths overlap one another.

\* \* \* \* \*